United States Patent [19]

Lopez et al.

[11] Patent Number: 5,240,168

[45] Date of Patent: Aug. 31, 1993

[54] METHOD FOR MAKING A COMPOSITE TO CARBON STEEL JOINT

[75] Inventors: Antonio Lopez, Kitchener; Delbert J. Campbell, St. George, both of Canada

[73] Assignee: The Babcock & Wilcox Company, New Orleans, La.

[21] Appl. No.: 932,868

[22] Filed: Aug. 20, 1992

[51] Int. Cl.$^5$ .................. B23K 31/02; B23K 101/10
[52] U.S. Cl. .................... 228/168; 228/170; 228/262.41; 285/286
[58] Field of Search .......... 228/168, 169, 170, 263.15; 285/286

[56] References Cited

U.S. PATENT DOCUMENTS 2,209,290  7/1940  Watts ................. 228/263.15 X
2,257,335  9/1941  Evans et al. ............... 285/286
4,949,895  8/1990  Sugiyama et al. .......... 285/286 X Primary Examiner—Kenneth J. Ramsey
Attorney, Agent, or Firm—Vytas R. Matas; Robert J. Edwards; Daniel S. Kalka

[57] ABSTRACT

An improved method for making a composite tube (10) to a carbon steel tube (16) joint or a composite tube (10) to a carbon steel header (50) joint is achieved by specially preparing the composite tube (10) by removing the cladding (12) from one end (24) to a predetermined length to provide base carbon steel material (14). The end (24) of the composite tube has cladding (12) tapered at a predetermined angle. This end (24) is then expanded. The composite tube (10) is then welded to the carbon steel tube (16) with fewer weld passes while also eliminating the stainless steel weld pass.

18 Claims, 9 Drawing Sheets

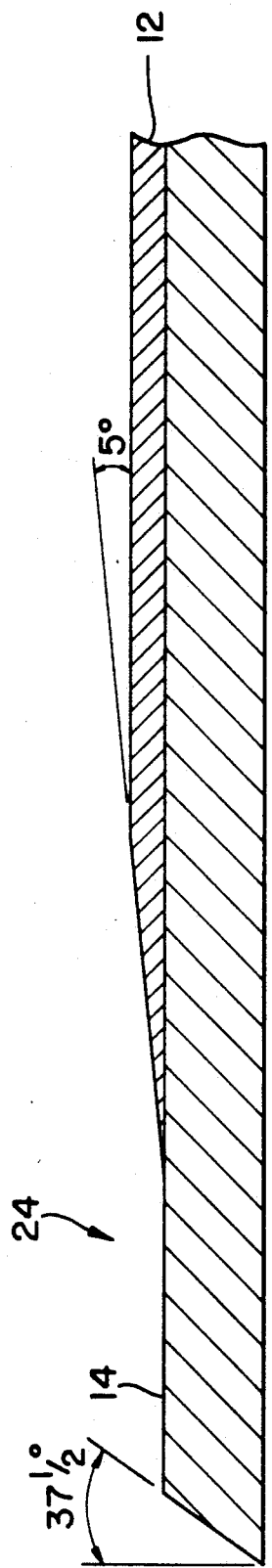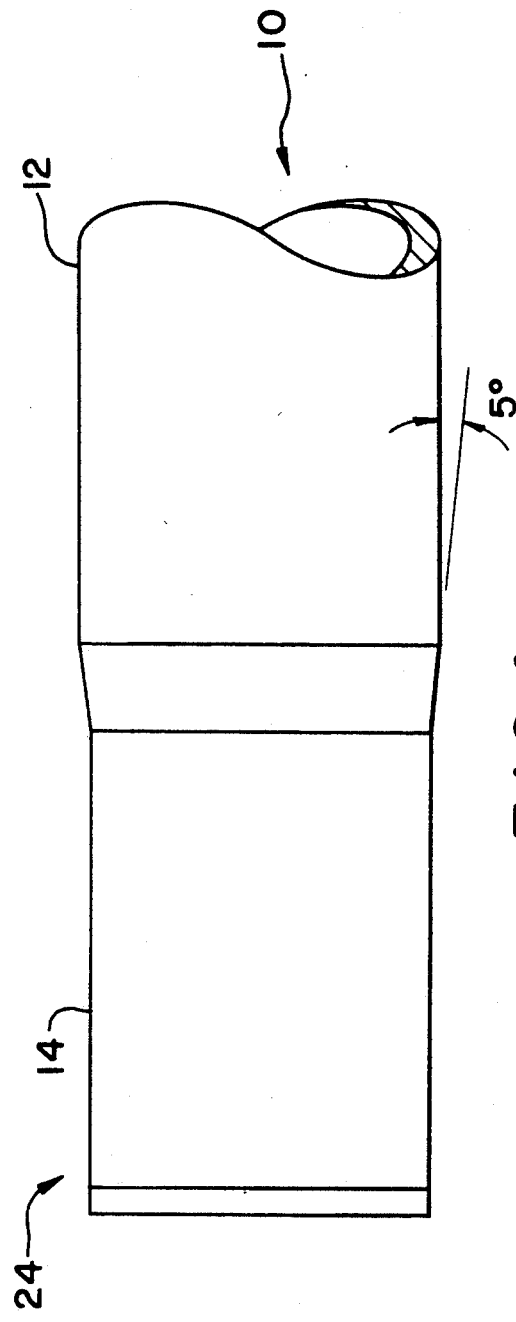
FIG. 5
FIG. 4

METHOD FOR MAKING A COMPOSITE TO CARBON STEEL JOINT

BACKGROUND OF THE INVENTION

Field of the Invention

The present invention relates in general to making a composite to carbon steel joint, and in particular relates to an improved method for welding a composite tube to a carbon steel or header joint in a manner which requires fewer welding passes and only carbon steel welds.

Description of the Related Art

A composite tube (10) is a term describing a carbon steel tube (14) with some type of cladding such as a stainless steel cladding (12) as shown in FIGS. 1 and 2. To make an effective composite tube to a carbon tube weld, there must be no contamination of the carbon weld by the stainless steel clad. Also, the carbon steel weld must be of a sufficient area to meet the code requirements. To achieve sufficient weld area the carbon steel tube is normally specially prepared. Currently, there are two methods employed to prepare the carbon steel tube, they are swaging and upsetting.

Referring to FIG. 1, the carbon steel tube (16) has the same outer diameter but smaller overall wall thickness than the composite tube (10). In the swaging method, the carbon steel tube (16) inner diameter is made equal to that of the composite tube (10) by bending or swaging the end (18) of the carbon steel tube (16). Two carbon steel welds (1, 2) are made and then followed by a stainless steel covering weld pass (3).

The other method presently employed for welding composite tubes to carbon steel tubes is the upsetting method shown in FIG. 2. With the upsetting method, the inner diameters of both tubes (10, 16) are made equal by thickening the end (18) of the carbon steel tube (16). Again, there are two carbon steel weld passes (1, 2) followed by a stainless steel weld pass (3).

With the present methods of welding composite tubes to carbon steel tubes, there is the risk of the stainless steel clad (12) contaminating the weld area (20) due to the proximity of the clad (12) to the weld area (20). In both of these methods, the composite and the carbon steel tubes are weld prep machined as is known in the art.

Similarly, when making a composite tube (10) to carbon steel header (22) joint, composite tube (10) is prepared by stripping back the stainless steel cladding (12) on the composite tube (10). A total of six weld passes are required to weld the composite tube (10) to the carbon steel header joint (22). Three carbon steel welds (1, 2, 3) are followed by three stainless steel weld passes (4, 5, 6) as shown in FIG. 3.

Consequently, the prior art methods require many weld passes as well as both carbon steel and stainless steel welds which result in extremely expensive joints in terms of material and time.

Thus, it is desirable for a new method of making a composite tube to carbon steel joint for either making a composite to carbon tube-to-tube joint or a composite tube-to-carbon steel header joint which is less costly and better designed for improved service life.

SUMMARY OF THE INVENTION

The present invention solves the aforementioned problems with the prior art as well as others by providing an improved method for making a composite tube to carbon steel joint which requires fewer carbon steel weld passes while also eliminating any stainless steel weld passes.

The improved method of the present invention makes a composite tube to a carbon steel joint by first preparing the carbon steel tube for welding. Then, the cladding is removed from one end of the composite tube to a predetermined length to provide base carbon steel material. Next, the cladding at the end of the composite tube is tapered at a predetermined angle. The end of the composite tube is expanded to a similar outer diameter as that of the carbon steel tube. Finally, the composite tube is then welded to the carbon steel tube with only two carbon steel weld passes.

The improved method of the present invention is also directed to making a composite tube to carbon steel header joint as previously described except without the weld prep of the carbon steel joint and with the end of the composite tube being expanded to an outer diameter about equal to the inner diameter of the carbon steel header joint. The composite tube is welded to the carbon steel header joint with only three carbon steel weld passes.

An object of the present invention is to provide an improved method for making a composite tube to a carbon steel tube joint which is less costly in material and time.

Another object of the present invention is to provide an improved method for making a composite tube to a carbon steel header joint which is less costly in both material and time.

A further object of the present invention is to provide a composite carbon steel joint which is simple in design, rugged in construction, and economical to manufacture.

The various features of novelty which characterize the present invention are pointed out with particularity in the claims annexed to and forming a part of this disclosure. For a better understanding of the invention, its operating advantages and specific objects attained by its uses, reference is made to the accompanying drawings and descriptive matter in which the preferred embodiments of the invention are illustrated.

BRIEF DESCRIPTION OF THE DRAWINGS

In the drawings:

FIG. 4 is a perspective view of an end of a composite tube that is prepared in accordance with the present invention;

FIG. 5 is a sectional view of FIG. 4;

DESCRIPTION OF THE PREFERRED EMBODIMENTS

Figure 1:
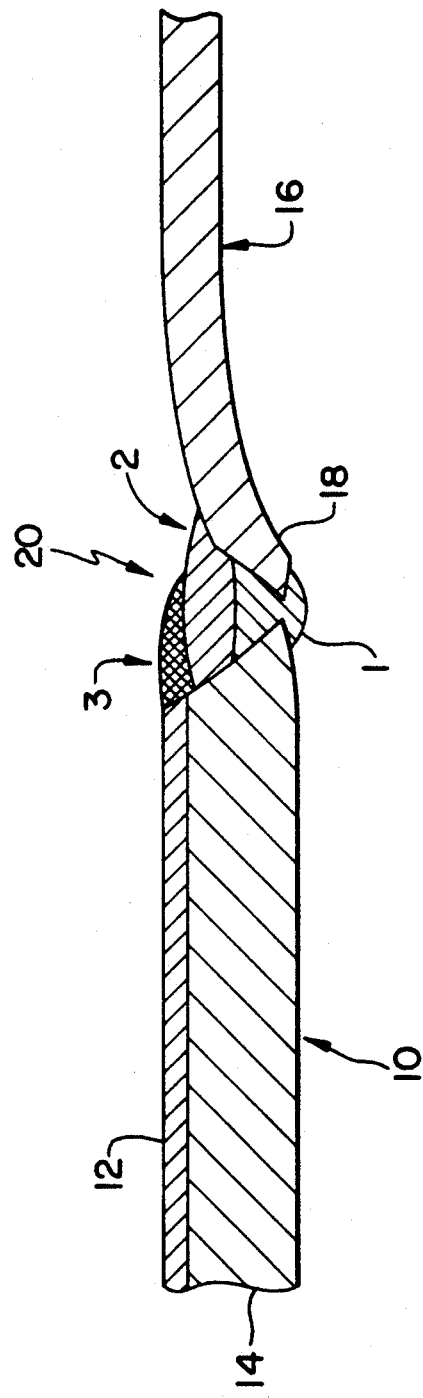
FIG. 1 is a sectional view of a prior art swaged composite tube-to-carbon steel-tube joint.
Figure 1A:
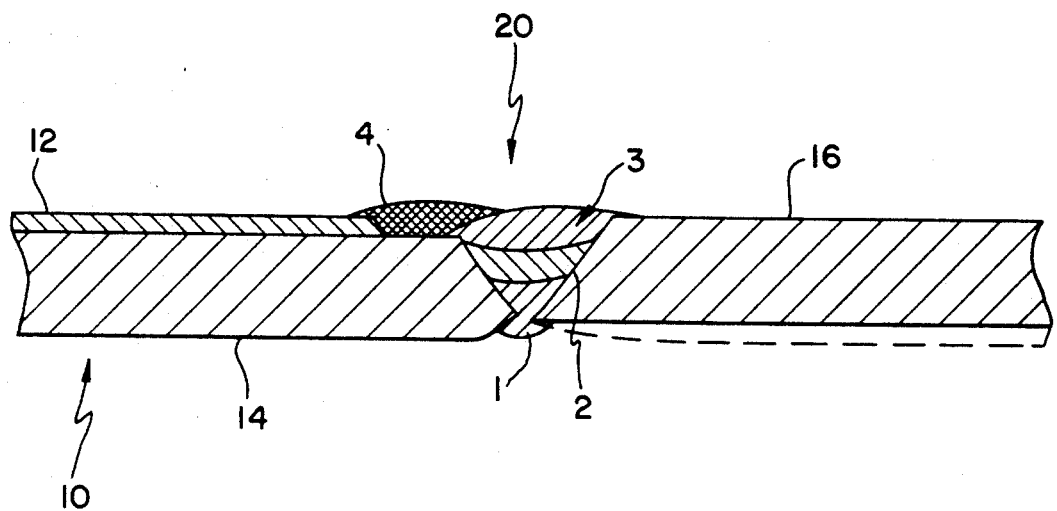
FIG. 1(a) is a sectional view of another prior art joint.
Figure 2:
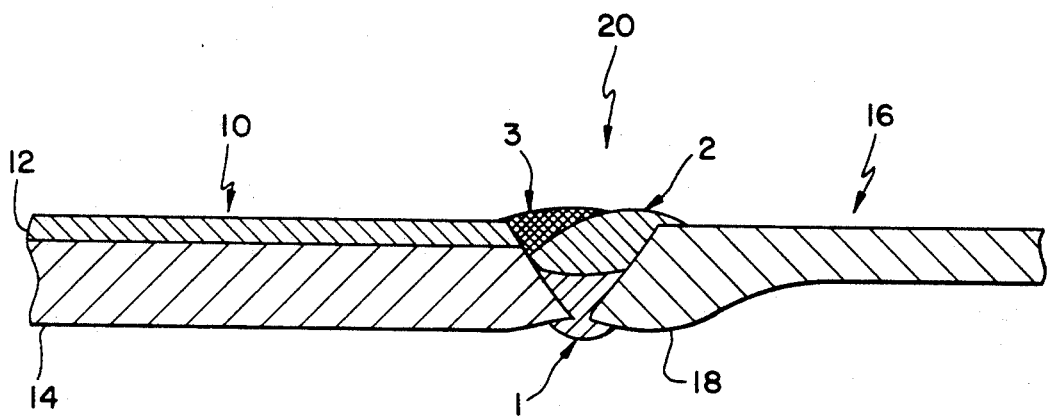
FIG. 2 is a sectional view of a prior art upset composite to carbon steel tube-to-tube joint.
Figure 3:
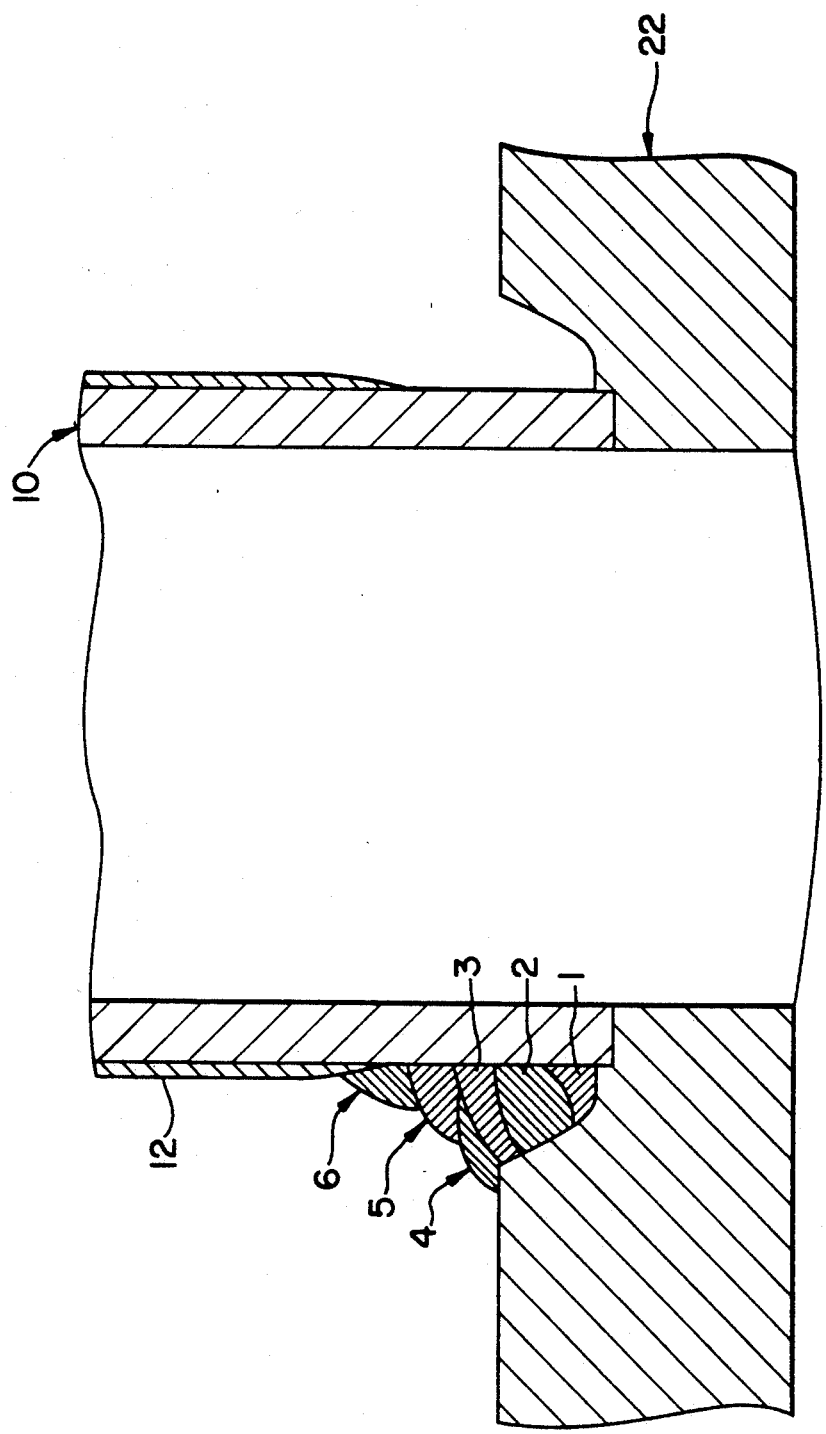
FIG. 3 is a sectional view of a prior art composite tube to carbon steel header joint.

Referring to FIGS. 4 and 5, the improved method of the present invention joins composite and carbon steel tubes by specially preparing the composite tube (10) rather than the carbon steel tube (16). This results in a much smoother composite to carbon steel tube transition while also eliminating the stainless steel weld pass. The stainless steel clad (12) is machined off one end (24) of the composite tube (10) to 0.010" below its nominal thickness to ensure only base carbon steel material (14) remains. The stainless steel clad (12) is removed to a maximum length of about 3⅜" from the end (24) and the cladding (12) is tapered at an angle of about 5° with respect to the outer diameter surface of the composite tube (10). The end (24) of the composite tube also preferably includes machining the end of the base carbon steel material (14) at about a 37½° angle with respect to a vertical axis to the end (24) of the composite tube (10).

While the cladding (12) is referred to as being stainless steel, it is of course understood that the cladding (12) on the composite tube (10) could be made of another material other than stainless steel.

Figure 6:
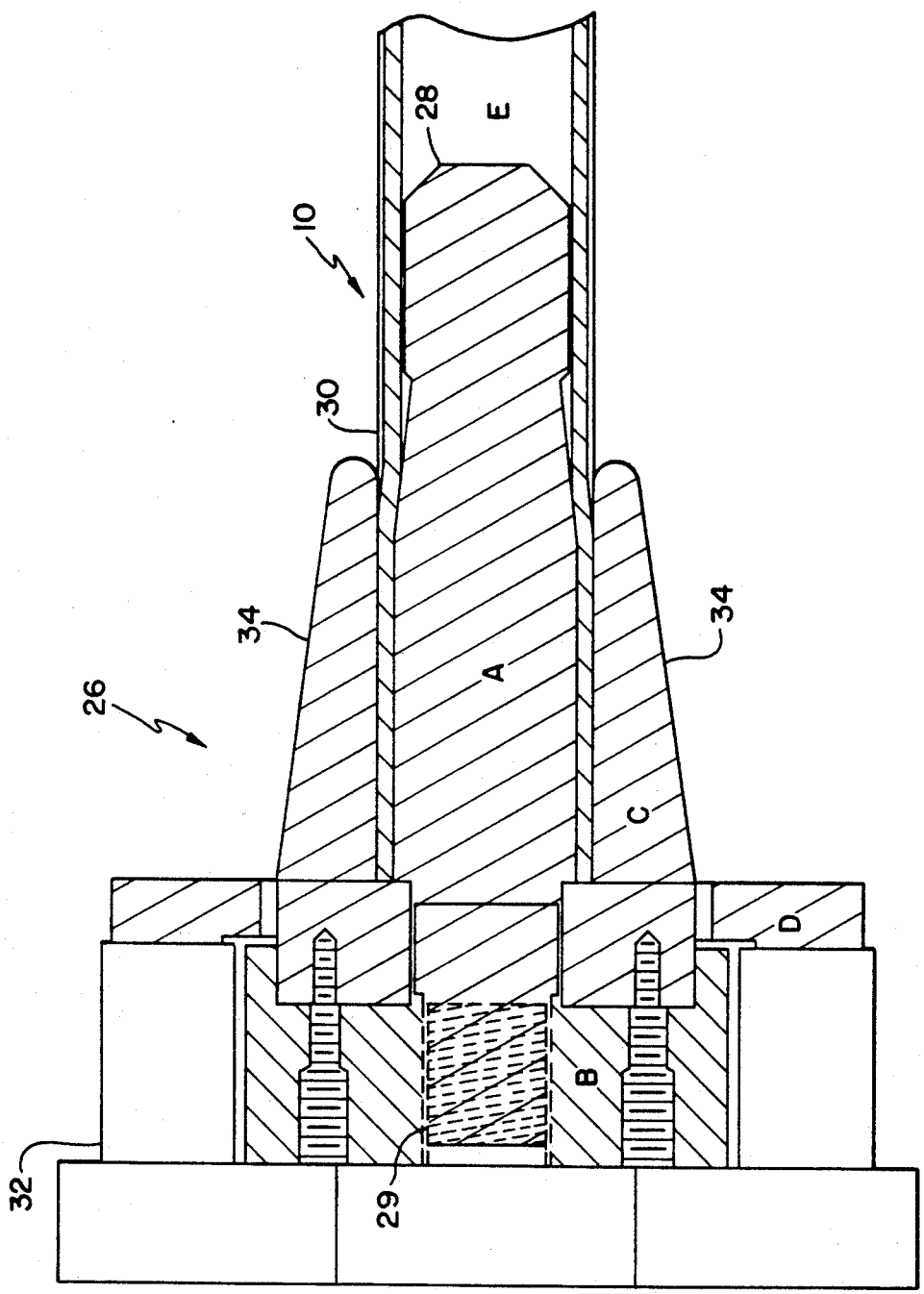
FIG. 6 is a sectional view of an individual tube expansion tool.
Figure 7:
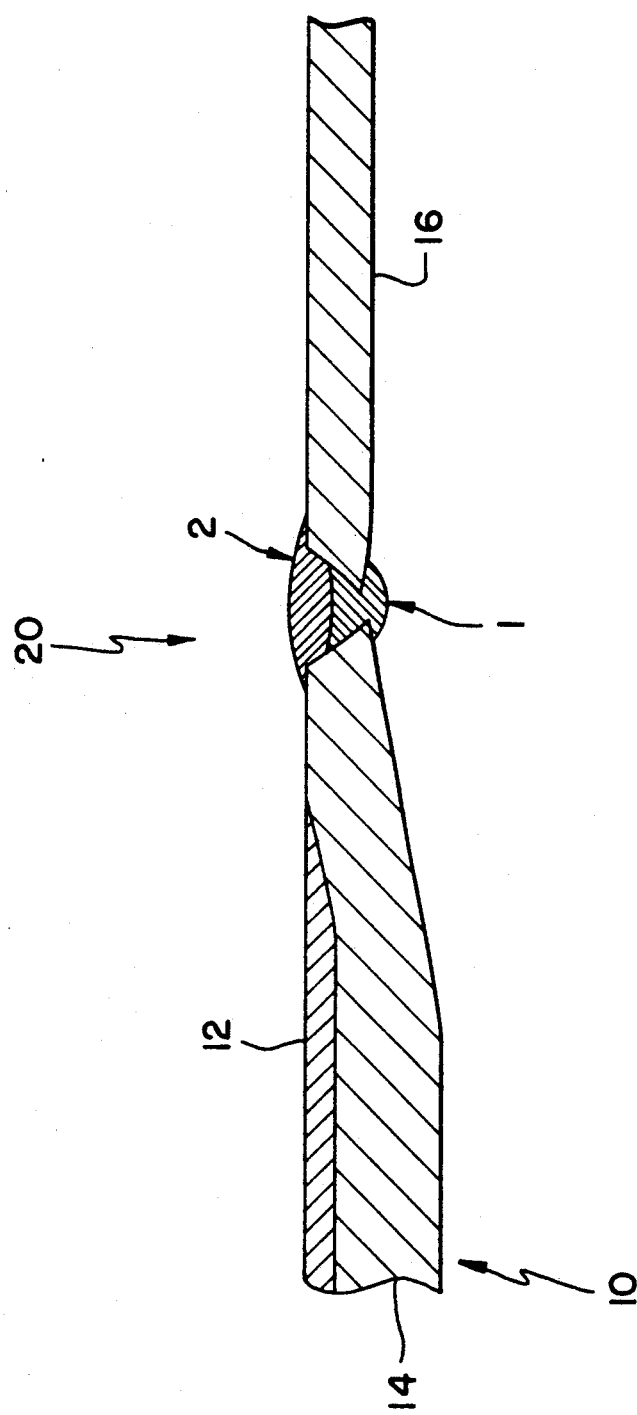
FIG. 7 is a sectional view of a composite tube to a carbon steel tube joint made with the method of the present invention.
Figure 9:
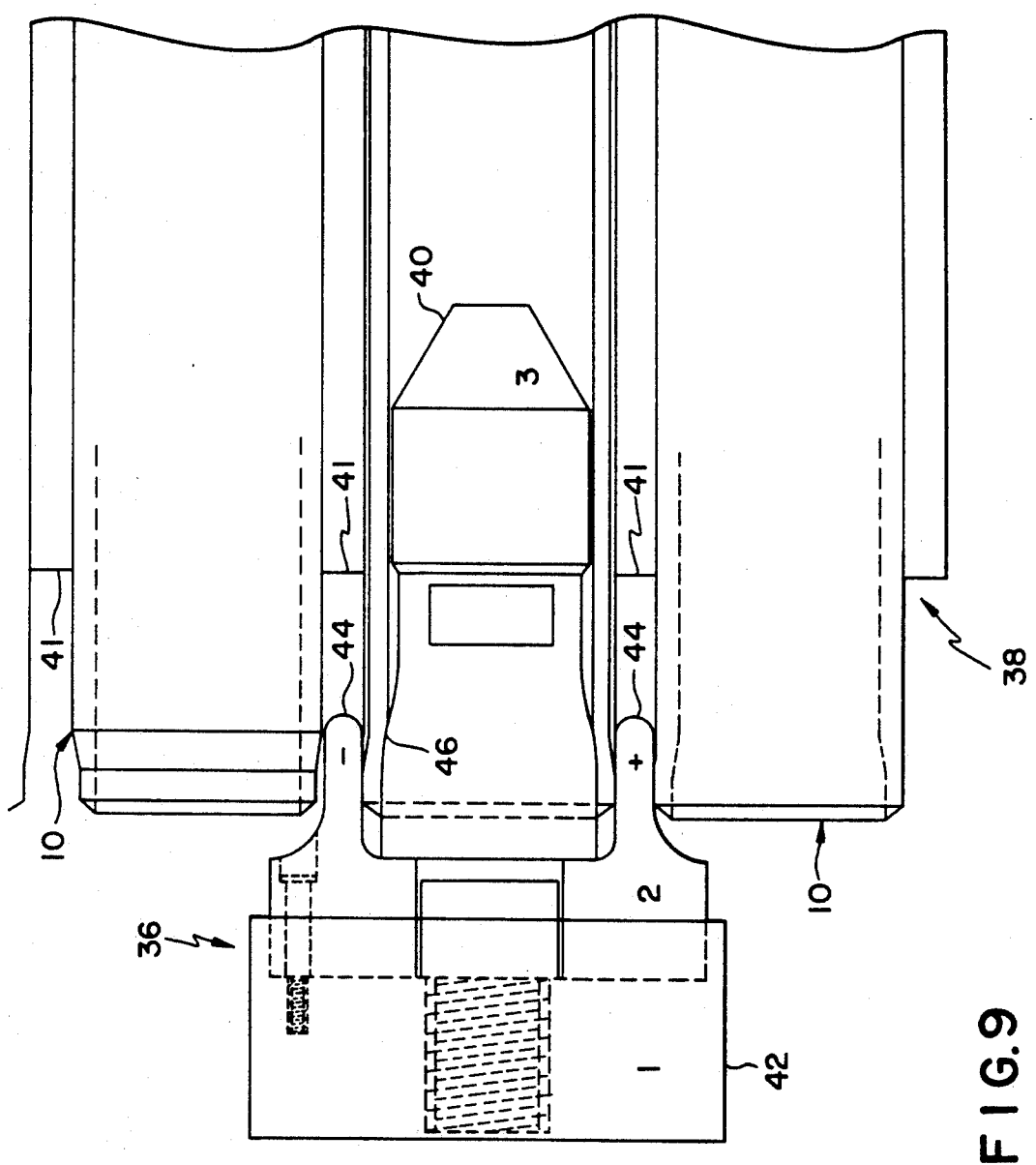
FIG. 9 is a sectional view of a membraned panel tube expansion tooling.

The prepared or machined end (24) is then expanded with either an individual tube expansion tool (26), or if the tube is part of a membrane wall (38), with a membrane panel tube expansion tool (36), as seen in FIGS. 6 and 9, respectively. The machined end (24) of the composite tube (10) is expanded to a substantially similar outer diameter as that of carbon steel tube (16) where it is welded together with only two carbon steel weld passes as shown in FIG. 7.

Figure 8:
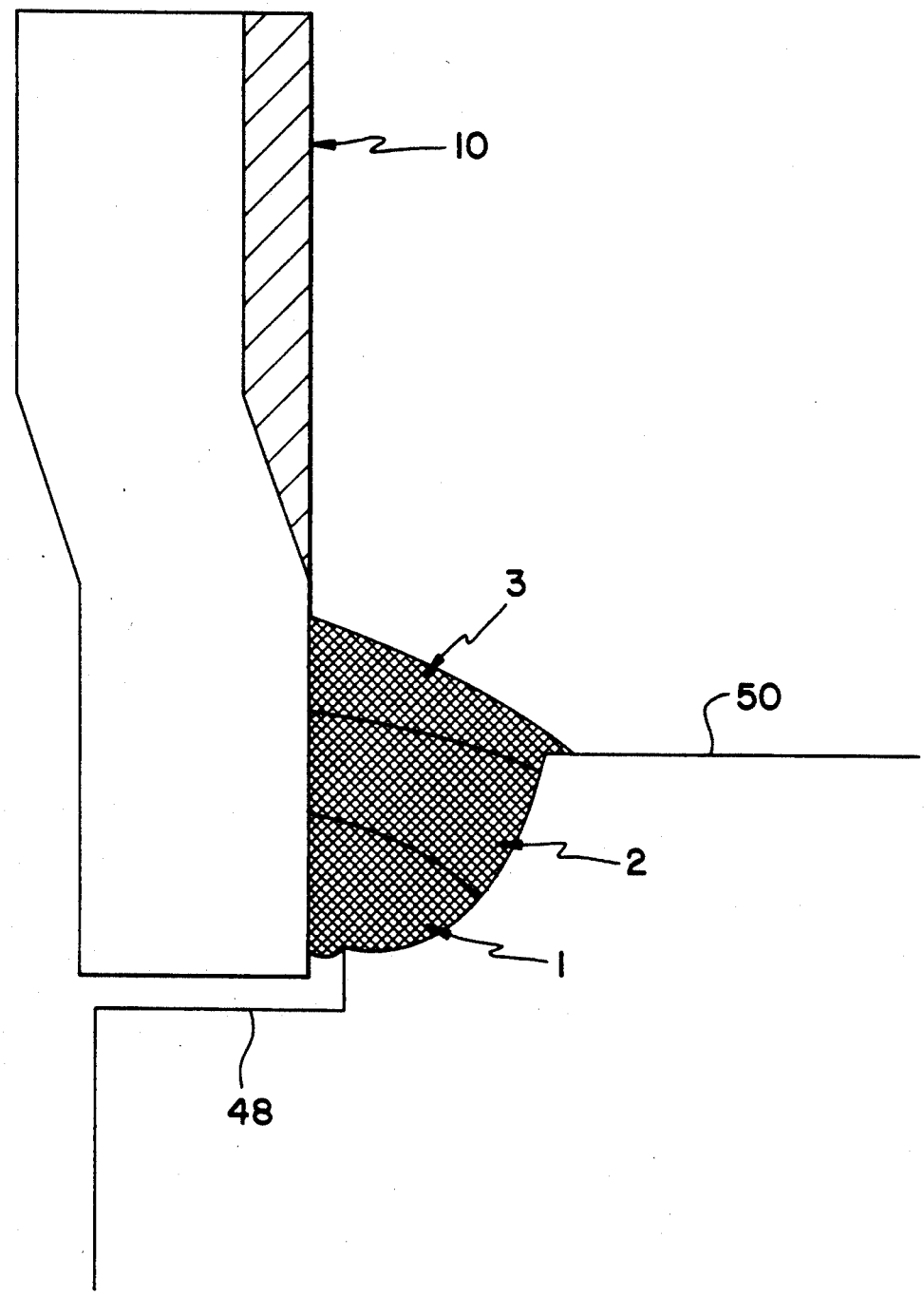
FIG. 8 is a sectional view of a portion of a composite tube to a carbon steel header joint made with the method of the present invention.

Similarly, the composite tube (10) prepared in the foregoing manner may be joined to a carbon steel header joint (48) except that it is not necessary to do a standard weld preparation on the carbon steel header joint (48) as it is with the carbon steel tube (16). Also, the outer diameter of the composite tube (10) is expanded to fit within the inner diameter of the header joint (48) as depicted in FIG. 8. Composite tube (10) is then joined to the carbon steel header (50) with three carbon steel weld passes (1, 2, 3). While FIG. 8 depicts the end (24) of composite tube (10) as being spaced away from the header joint (48), it is understood that the end (24) of composite tube (10) can very easily be abutted against the header joint (48).

Referring to FIG. 6, the individual tube expansion tool (26) includes a mandrel (28) which fits securely inside the composite tube (10) and has a slanted enlarged portion (30) the expand to end (24) of composite tube (10). Mandrel (28) is securely engaged to a base (32) by a threaded end (29).

An external ramming force sufficient in strength, for example, 35 to 45 tons, to expand a composite tube is applied in the direction of the arrow F to base (32).

The outside of the tube (10) is supported with support members (34) which are also securely mounted into the base (32). This ensures minimum ovality and tube thickness consistency of the composite tube (10) as it undergoes expansion. Of course, composite tube (10) must be supported when expanding an individual tube by a rigid support or holder known in the art.

The membrane panel tube expansion tool (36) is shown in FIG. 9 expanding a composite tube (10) which is part of a composite tube membrane panel (38). Membrane panel (38) includes a plurality of composite tubes (10) joined together by a seam (40) to form a wall. The membrane panel tube expansion tool (36) includes a mandrel (40) which is threadably engaged into a base (42). Mandrel (40) fits snugly inside one composite tube (10) of the membrane panel (38) and includes an enlarged portion (46) at one end to expand the composite tube (10) when a force F' is applied to the base (42). The enlarged portion (46) is similar to the tapered portion (30) of mandrel (28) and may be of any shape which would expand the outer wall composite tube (10) in the fashion previously described. The base (42) includes support members (44) which support the outer wall of the composite tube (10) as it is being expanded. Support members (44) are constructed so that they fit in the space between adjacent tubes (10) in the membrane wall (38). Support members (44) are of a length sufficient to fit within the space between the end of the tube (10) and the beginning of the seam (41) as seen in FIG. 9. It is readily seen that the composite tube (10) may be specially machined individually or as part of a membrane panel (38).

The improved method of the present invention for making composite to carbon steel tube joints and composite tube to carbon steel header joints offers several advantages over current methods including but not limited to the following. The stainless steel weld passes are eliminated resulting in significant cost savings. A much smoother transition and overall wall thickness from the composite to the carbon steel tube is achieved and as a result, the risk of cracking due to thermal expansion differences is minimized. The internal surface of the tube is smoother, reducing flow friction losses, and minimizing the possibility of crack initiation. The removal of the stainless steel clad eliminates the risk of contamination of the carbon steel weld. The present method is suited to both tube-to-tube as well as tube-to-header joints as shown in FIGS. 7 and 8. The composite tube preparation can be done on individual tubes with the individual tube expansion tool (26), or on composite tubes after the membrane panel has been fabricated or welded together when the membrane panel tube expansion tool (36) is used.

In addition, the composite tube does not crack upon mandrel expansion, because it is supported on the outside of the tube by the support members (34, 44). This has been shown with composite tubes supplied from several suppliers. Even though the composite tube wall thickness is reduced in the expanded area, the thickness is still above code minimum.

While specific embodiments of the present invention have been shown and described in detail to illustrate the application and principles of the invention, it will be understood that it is not intended that the present invention be limited hereto and that the invention may be embodied otherwise without departing from such principles.

I claim:

1. An improved method for making a composite tube to a carbon steel tube joint, comprising the steps of:
    preparing the carbon steel tube for welding;
    removing cladding from one end of the composite tube to a predetermined length to provide base carbon steel material;
    tapering at a predetermined angle a portion of cladding beyond the predetermined length at the end of the composite tube that has the cladding removed;
    expanding the end of the composite tube with the cladding removed to a similar outer diameter as that of the carbon steel tube; and welding the composite tube to the carbon steel tube.

2. An improved method as recited in claim 1, further comprising the step of supporting an outside wall of the composite tube as it is being expanded.

3. An improved method as recited in claim 2, wherein the predetermined angle is about 5° with respect to an outer surface of the cladding on the composite tube.

4. An improved method as recited in claim 3, wherein the end of the composite tube with the cladding removed is beveled at an angle of bout 37½°.

5. An improved method as recited in claim 2, wherein the expanding step includes an individual tube expansion tool.

6. An improved method as recited in claim 2, wherein the expanding step employs a membrane panel tube expansion tool.

7. An improved method as recited in claim 2, wherein the predetermined length is about 3⅞" from the end.

8. An improved method as recited in claim 1, wherein the welding step is performed with only two carbon steel weld passes.

9. An improved method for making a composite tube to a carbon steel header joint, comprising the steps of:
    removing cladding from one end of the composite tube to a predetermined length to provide base carbon steel material;
    tapering at a predetermined angle a portion of cladding beyond the predetermined length at the end of the composite tube that has the cladding removed;
    expanding the end of the composite tube that has the cladding removed to an outer diameter about equal to an inner diameter of the carbon steel joint; and
    welding the composite tube to the carbon steel joint.

10. An improved method as recited in claim 9, further comprising the step of supporting an outside wall of the composite tube as it is being expanded.

11. An improved method as recited in claim 10, wherein the predetermined length is about 3⅞" from the end.

12. An improved method as recited in claim 10, wherein the predetermined angle is about 5°.

13. An improved method as recited in claim 12, wherein the end of the composite tube with the cladding removed is beveled at an angle of about 37½°.

14. An improved method as recited in claim 9, wherein the expanding step employs an individual tube expansion tool.

15. An improved method as recited in claim 9, wherein the welding step is performed with only three carbon steel weld passes.

16. An improved method as recited in claim 9, wherein the expanding step employs a membrane panel tube expansion tool.

17. An improved method as recited in claim 1, wherein the removing step includes machining the cladding off about 0.010 inch below its nominal thickness.

18. An improved method as recited in claim 9, wherein the removing step includes machining the cladding off about 0.010 inch below its nominal thickness.

* * * * *